United States Patent [19]

Aldrich

[11] Patent Number: 4,705,639

[45] Date of Patent: Nov. 10, 1987

[54] FERROUS AND SULFIDE TREATMENT OF ELECTROPLATING WASTEWATER

[75] Inventor: James R. Aldrich, Tyndall AFB, Fla.

[73] Assignee: The United States of America as represented by the Secretary of the Air Force, Washington, D.C.

[21] Appl. No.: 733,294

[22] Filed: May 10, 1985

[51] Int. Cl.$^4$ .................. C02F 1/52; C02F 1/70
[52] U.S. Cl. .................. 210/720; 210/724; 210/726; 210/913; 423/55
[58] Field of Search ............ 210/702, 720, 724–728, 210/913, 721; 423/55, 57, 58

[56] References Cited

U.S. PATENT DOCUMENTS

| | | | |
|---|---|---|---|
| 2,153,060 | 4/1939 | Guthrie | 204/1 |
| 2,313,755 | 3/1943 | Loose | 148/6 |
| 2,478,692 | 8/1949 | Hack et al. | 148/6.21 |
| 2,504,434 | 4/1950 | Mason | 148/6.2 |
| 2,850,415 | 9/1958 | Harrison | 148/6.14 |
| 2,850,419 | 9/1958 | Melse et al. | 148/6.21 |
| 2,911,332 | 11/1959 | Schuster et al. | 148/6.2 |
| 3,740,331 | 6/1973 | Anderson et al. | 210/912 |
| 4,102,784 | 7/1978 | Schlauch | 210/912 |
| 4,329,224 | 5/1982 | Kim | 210/912 |
| 4,402,836 | 9/1983 | Fochtman et al. | 210/748 |
| 4,422,943 | 12/1983 | Fender et al. | 210/912 |
| 4,432,880 | 2/1984 | Talbot | 210/912 |

FOREIGN PATENT DOCUMENTS

| | | | |
|---|---|---|---|
| 49-16714 | 2/1974 | Japan | 210/913 |
| 49-69544 | 7/1974 | Japan | 210/913 |
| 50-35061 | 4/1975 | Japan | 210/913 |

OTHER PUBLICATIONS

Kim "Treatment of Metal Containing Wastewater by Sulfide Precipitation," AICHE 73rd Annual Meeting, Nov. 1980, pp. 1-12.
Higgins et al., "Combined Removal of Cr, Cd, and Ni by Alkaline Reduction, Precipitation and Upflow Filtration," Mar. 1983.
Higgins et al., "Treatment of Plating Wastewaters by Ferrous Reduction, Sulfide Precipitation, Coagulation and Upflow Filtration" presented at 36th Ann. Purdue Ind. Waste Conf. Indiana, May 12–14, 1981.
Higgins et al., "Treatment of Electroplating Wastewater by Alkaline Ferrous Reduction of Chromium & Sulfide Precipitation," Jun. 1983.

Primary Examiner—Peter Hruskoci
Attorney, Agent, or Firm—Stanton E. Collier; William J. O'Brien; Donald J. Singer

[57] ABSTRACT

The present invention involves a treatment technique for drastically reducing the volume of hazardous sludge generated by the chemical reduction of chromium contaminants and the precipitation of heavy metal contaminants from contaminated electroplating wastewater. The wastewater is first adjusted to a pH of from about 8 to 10 and then treated with sodium sulfide to provide sulfide ions to effect precipitation of heavy metal contaminants followed by treatment with ferrous sulfate or ferrous chloride to provide ferrous ions to chemically reduce the hexavalent chromium to its trivalent state. This method produces approximately one-fourth the sludge generated by the previously known acidic reaction treatment using only ferrous sulfide.

2 Claims, 7 Drawing Figures

FERROUS AND SULFIDE TREATMENT OF ELECTROPLATING WASTEWATER

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for treating electroplating wastewater. In a more specific aspect, this invention concerns itself with a method involving the use of ferrous sulfate and sodium sulfide to effect the simultaneous reduction of hexavalent chromium contaminants and precipitation of heavy metal contaminants from electroplating wastewater.

In general, electroplating wastewaters bearing heavy metals such as copper, cadmium, nickel, and chromium, are relatively easy to treat in chemical precipitation systems. The effluent quality obtained is limited only by the solubility of the metal salts formed in the reaction. This is because these heavy metals all readily form hydroxides or sulfides, with the notable exception of chromium; which will not form a sulfide at standard temperature and pressure. Additionally, chromium generally requires an additional treatment step to reduce the ion from the hexavalent to the trivalent state. Many treatment chemicals can be used for this reduction. Among these are ferrous sulfate, sodium bisulfite, sulfur dioxide, and sodium sulfide. While all these chemicals work well from the standpoint of effluent quality, the quantity of sludge produced by the different processes can vary dramatically.

With the advent of the Resource Conservation and Recovery Act (RCRA), producing clean water is no longer sufficient. Hauling and disposal charges for hazardous sludge are over $100/ton in many areas, hence the volume of sludge for disposal is nearly as important as the effluent quality. Some of the more exotic treatment chemicals, such a sodium borohydride, are extremely efficient from a sludge production standpoint (8 moles of electrons are available per mole of reactant), but they are quite expensive and have not been fully tested on mixed metal wastewaters. To address this problem, a concerted research effort was undertaken to investigate the sludge volumes produced by the more common reduction chemicals, and to provide a more efficient and economical treatment procedure. Even though wastewater treatment plants must treat mixed-metal wastes, chromium was singled out for this investigation because it alone requires both reduction and hydroxide precipitation.

Present treatment technology for chromium reduction is predicated on the fact that the rate of chromium reduction depends upon the pH of the waste solution. Taking the "standard" practice as ferrous reduction the reaction is:

$$3Fe^{2+} + HCrO_4^- + 7H^+ \rightarrow 3Fe^{3+} + Cr^{3+} + fH_2O \qquad (1)$$

The rate of this reduction reaction was quantified as:

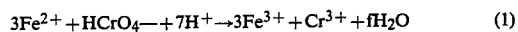

$$\frac{d[HCrO_4^-]}{dt} = -\frac{[Fe^{2+}]^2[H^+]^3(k_1[HCrO_4^-] + k_2[HCrO_4^-]^2)}{[Fe^{3+}]}$$

Since this rate equation is third order with respect to the hydrogen ion concentration ([H+]), it has been the basis for claims that chromium reduction is very slow at all but acidic pH levels. Each unit increase in pH (i.e., decrease in [H+]) would decrease the rate of the reaction by three orders of magnitude. For example, it has been calculated that reducing 100 milligram per liter (ppm) of hexavalent chromium at pH 3 would take over 1000 times longer than at pH 2 (90 minutes vs. 5 seconds).

Completely contrary to the rate question, as shown in equation (2) above, others have indicated that hexavalent chromium could be rapidly reduced at pH 8.0. Additional follow-up work in this technical area, however, has clarified this apparent dichotomy. The work illustrated by equation (2) was done with very large (and, hence, assumed constant) concentrations of ferric ion (Fe³⁺) at a very acidic pH. Under these acidic conditions, this assumed constant ferric concentration was valid. However, at near neutral or at alkaline pH levels, the solubility of the ferric ion depends upon the concentration of hydroxide (OH⁻) as follows:

$$Fe^{3+} + OH^- \rightarrow Fe(OH)_3 \qquad (3)$$

Using the solubility product, $$K_{sp} = [Fe^{3+}][OH^-], \qquad (4)$$

and the disassociation constant for water, $$K_w = [H^+][OH^-], \qquad (5)$$

and combining and substituting them into equation (2), the result is an expression independent of pH.

$$\frac{d[HCrO_4^-]}{dt} = -\frac{[Fe^{2+}]^2 K_w^3 (k_1[HCrO_4^-] + k_2[HCrO_4^-]^2)}{k_{sp}} \qquad (6)$$

This research work has opened the full pH range for chromium reduction reactions. In light of this, the pH conditions for effecting a chemical reduction was investigated with respect to sludge production in the research effort which culminated with the present invention.

SUMMARY OF THE INVENTION

The present invention concerns itself with a process for treating electroplating wastewater contaminated with undesirable heavy metal contaminants. The invention is carried into effect by treating the contaminated wastewater with a combination of chemical treating agents which include the steps of adding ferrous ions and sulfide ions to bring about the simultaneous reduction of hexavalent chromium contaminants and the precipitation of heavy metal contaminants, such as copper, cadmium and nickel, in the form of a sludge in considerably lesser volume than achieved heretofore.

The overall efficiency of the present method of treating heavy metal contaminated wastewater reduces the volume of hazardous sludge produced during the treatment procedure by 30 to 70 percent (depending on chromium concentration). In considering the amount of sludge produced each year by treatment techniques, generally about 20,000 tons per year, the volume reduction achieved by the one step reduction and precipitation method of this invention can save millions of dollars in disposal costs.

To be more specific, the unexpected results of this invention are achieved by first determining the hexavalent chromium content of the wastewater and then adjusting and increasing the hydroxyl ion concentration of the wastewater to a pH ranging from about 8 to 10. Following the pH adjustment, sulfide ions, in the form of sodium sulfide, are added to the wastewater in milliequivalent amounts of about 90 percent of the milliequivalent amount of hexavalent chromium present in the wastewater. After addition of the sodium sulfide, ferrous ions in the form of ferrous sulfate or ferrous chloride are added in millequivalent amounts equal to about 10 percent of the milliequivalent amounts of hexavalent chromium present in the wastewater. If desired excess ferrous ion can be added up to about 20 percent of the milliequivalent amounts of hexagonal chromium. The wastewater can then be treated, if desired, with conventional clarifying and flocculating agents and the resultant sludge removed.

Accordingly, the primary object of this invention is to provide a novel method for treating heavy metal contaminated electroplating wastewater which can effect a significant and unexpected lowering in the amount of sludge formation produced during treatment.

Another object of this invention is to provide a method for the chemical reduction of the hexavalent chromium contaminants to their trivalent state and the simultaneous precipitation of heavy metal contaminats during the treatment of contaminated electroplating wastewater.

The above and still other objects and advantages of the present invention will become more readily apparent upon consideration of the following detailed description thereof when viewed in conjunction with the accompanying drawings.

DESCRIPTION OF THE PREFERRED EMBDOIMENT

Pursuant to the above-defined objects, the present invention concerns itself with the treatment of contaminated electroplating wastewater to minimize the volume of sludge which is produced during such treatment procedures. These objects are accomplished by adjusting the pH of the wastewater to about 8 to 10 followed by the addition of sulfide ions and ferrous ions in predetermined amounts depending on the concentration of hexavalent chromium ion contaminants found in the wastewater.

Although ferrous ions ($Fe^{2+}$) has long been a standard chemical used for chromium reduction, the resulting sludge volume can be tremendous because of the following reactions:

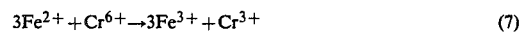
(7)

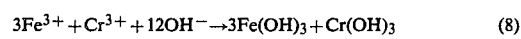
(8)

For each mole of chromium reduced and precipitated, 3 moles of ion are oxidized and precipitated. Theoretically, the volume of the solids produced is:

| | |
|---|---:|
| 1 mole of Chromium = | 52 g |
| 3 moles of Hydroxide = | 51 g |
| | 103 g |
| 3 moles of Iron = | 165 g |
| 9 moles of Hydroxide = | 153 g |
| | 318 g |

Thus, even without considering water of hydration, the sludge resulting from the formation of unwanted ferric hydroxide is over three times greater than that from the chromium hydroxide.

An alternative chemical, sulfide, has been used with varying degrees of success to avoid this ferric hydroxide sludge factor. However, a problem arises since chromium does not readily form a sulfide and sulfides themselves (valence $-2$) are weak acids.

Hence, in the acidic range (pH 4), sulfides exist as hydrogen sulfide ($H_2S$), a noxious and toxic gas. In spite of this, methods for acidic sulfide reduction have been developed. Two such methods, the Insoluble and Soluble Sulfide Processes (ISP and SSP), can be written as:

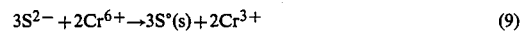
(9)

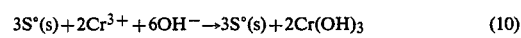
(10)

The theoretical sludge produced by this sulfide reaction is:

| | |
|---|---:|
| 2 moles Chromium = | 104 g |
| 6 moles hydroxide = | 102 g |
| | 206 g |
| 3 moles sulfur = | 96 g |

The sulfides contribute less than one half of the sludge as that from the chromium hydroxide.

Alkaline reduction of chromium would shift the sulfide specie distribution to $S^{2-}$. This would reap benefit of less sludge, and still control the hydrogen sulfide gas. To investigate this possibility, the research effort which culminated in the present invention, included treating a solution of 50 ppm hexavalent chromium in distilled water with varying dosages of ferrous and sulfide. In addition, the pH was varied to investigate its effect on both the quality of the precipitated floc and resulting sludge volume.

Figure 5:
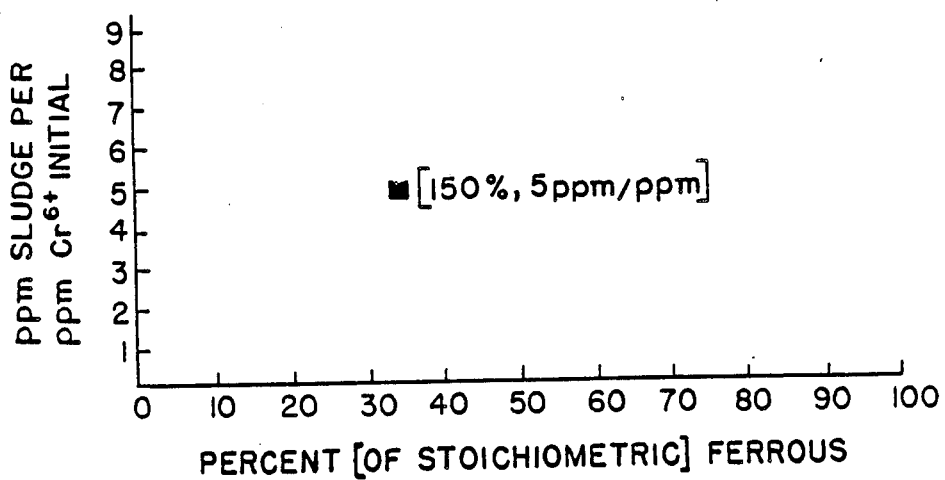
FIG. 5 is a graph showing data plots which express the ratio of sludge produced to the amount of hexavalent chromium present in the contaminated wastewater.

Reducing the iron dosage to an absolute minimum, because of sludge production, may at first seem the logical goal; however, ferric ion ($Fe^{3+}$) has long been used as a flocculation agent. Because of this, both iron and sulfide were used in varying proportions. So that sludge production could be compared regardless of the initial concentration of hexavalent chromium, the data was expressed as a ratio of ppm sludge produced (on a dry weight basis) to the initial ppm of hexavalent chromium in solution. For example, if a 60 ppm solution of chromium, after reduction and precipitation, produced 300 ppm of sludge, the ordinate for that data point would be 300/60 or 5.0 (a dimensionless number). This ordinate means that for every one part chromium treated, five parts of sludge were produced. The percent of the reducing chemical dosage that was ferrous ion (vs. the percent sulfide) would be plotted on the abscissa. These percentages were based on three milliequivalents of reducing agent per millimole of hexavalent chromium (i.e., $Cr^{6+} + 3e^- \rightarrow Cr^{3+}$). For example, if in the reaction mentioned above, the 3.47 meq/l of hexavalent chromium had been reduced with 1.73 meq of ferrous and 1.73 meq of sulfide, the abscissa for the data point would be 50 percent and would be plotted as shown in FIG. 5 of the drawings.

The first step was to calculate the expected sludge production. Although hydration water would be carried into the sludge, for simplicity, only precipitation of ferric hydroxide was considered. The reaction is:

(11)

Secondly, sulfide was assumed to precipitate as solid sulfur as follows:

(12)

Figure 6:
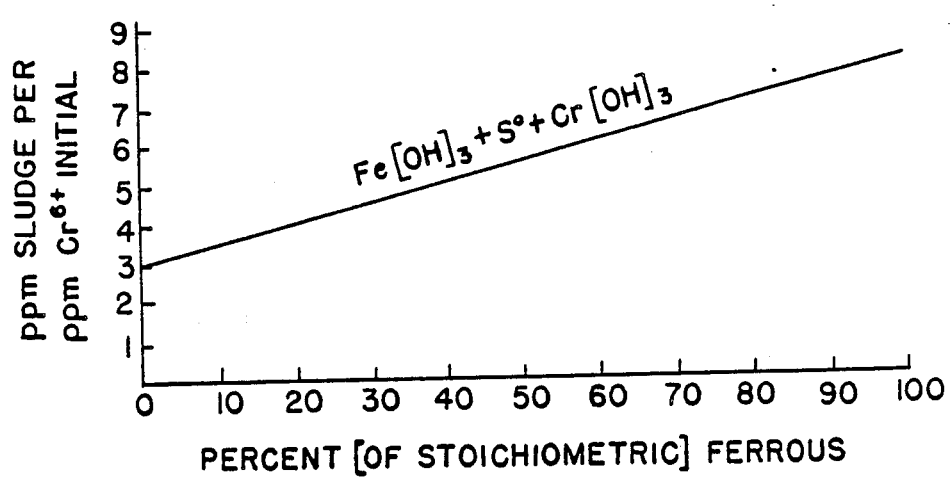
FIG. 6 is a graph illustrating theoretical sludge production.

The sludge production under these conditions is shown in FIG. 6 of the drawing.

A stock solution of 500 ppm hexavalent chromium was prepared using oven dried chromic acid and distilled water. This stock was then diluted nine-to-one for each experimental run. The reducing chemicals were reagent grade, solid sodium sulfide and ferrous sulfate. They were mixed with distilled water to a concentration of 0.1 meq/l and prepared daily as needed.

The experimental runs were done using 500 mls of the diluted stock solution in 1 liter beakers. A standard paddle device was used for stirring. To simulate turbulent flow in a pipe, the paddle device was set at 100 RPM for pH adjustment and reducing agent addition. Initial pH levels of 1.5, 3.5, 8.0, and 10.0 pH units were achieved using sodium hydroxide (i.e., caustic). After the reduction, any additional pH adjustment was also done using caustic. All precipitations were done at or above pH 8.0.

Once the pH was set, the reducing chemicals were added with an adjustable pipet. First the sulfide was added at a full percent dosage. Then the ferrous was added in one-half ml doses until the yellow hexavalent chromium color changed to the blue characteristic of trivalent chromium. The solution was then checked using the standard diphenylcarbazide (DPC) reaction per standard methods with ferrous being added until no DPC reaction was observed.

As soon as the reduction was complete (typically 2-4 minutes), the paddles were slowed to 20 RPM for 30 minutes total mixing and reaction time. The paddles were then shut off and the floc allowed to settle. The solution was generally clear in 1 to 2 minutes when 10 ml aliquots of the solution were taken for metals analysis. All metals were checked using flame atomic absorptions. Once the metal samples were drawn, the paddles were again started at 100+ RPM to mix the floc. Then 25 ml samples of the solution/solids were pipeted for solids analysis.

The solids analyses were done per standard methods for dry weights solids. All "volumes" or "volumes of sludge" reported herein refer to the dry weight solids. In addition, all experimental runs were done in duplicate.

Figure 7:
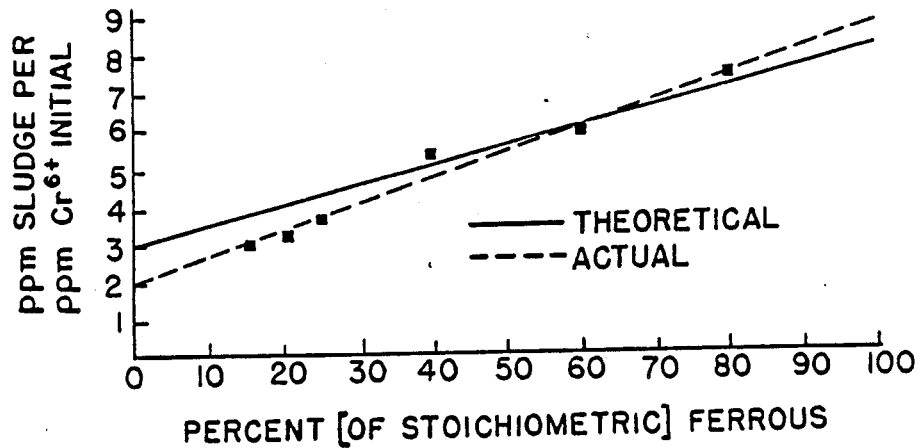
FIG. 7 is a graph showing baseline sludge production from acidic (pH 1.5) ferrous chromium reduction.

As a baseline, the "standard" reaction was assumed to be acidic reduction (pH 1.5) with ferrous sulfate followed by hydroxide precipitation at pH 8.0. Although lime is frequently used for pH adjustment and sludge conditioning, caustic was selected for these experiments because lime's very low solubility rate causes undissolved lime to be carried into the sludge. Additionally, if caustic sludges would both settle well and could be effectively dewatered, caustic precipitation would also provide a significant sludge volume reduction as compared to lime precipitation. The results of these baseline runs are shown in FIG. 7. This data was linearized using at least squares method.

FIG. 7 shows that the sludge produced from a 100-percent ferrous, acidic reaction (pH 1.5) is only slightly greater than theoretical (8.1 vs 7.8 mg sludge/mg $Cr^{6+}$). However, this volume is tremendous when compared to the fraction of the total sludge that is chromium hydroxide. At 100 percent ferrous, each part of chromium removed from the wastewater yielded over 8 parts of hydroxide waste for disposal. To better realize what this means, assume the disposal charge for sludge is $100 per ton. At 8 parts sludge per 1 part chromium hydroxide, the actual cost for chromium disposal is not $100, but 8 times that amount.

To avoid such an excessive quantity of sludge, and the related disposal costs, the logical step would be to eliminate the iron (and hence the ferric hydroxide) from the treatment process. However, using only sulfide for chromium reduction at acidic pH produces $H_2S$ gas and is not practical without special safety precautions.

However, sludge production using limited ferrous dosages of 10-20 percent milliequivalents of the milliequivalent amount of hexavalent chromium was 60 to 70 percent less than from the pure ferrous reduction. To control sulfide odor problems from the $H_2S$, additional reductions were done at pH levels of 8 and 10 concentrating on this 10-20% ferrous range. The results are shown, respectively in FIGS. 1 and 2.

In the 10-20 percent ferrous range, these alkaline reactions produced 2.8 to 3.8 mg sludge per mg $Cr^{6+}$ treated.

Figure 1:
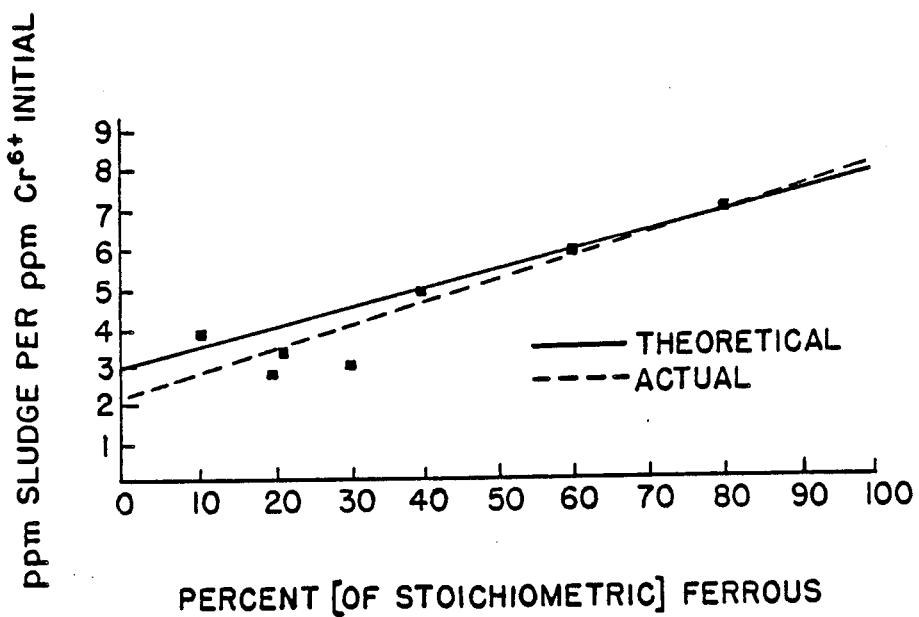
FIG. 1 is a graph showing sludge production at an alkaline pH of 8.
Figure 2:
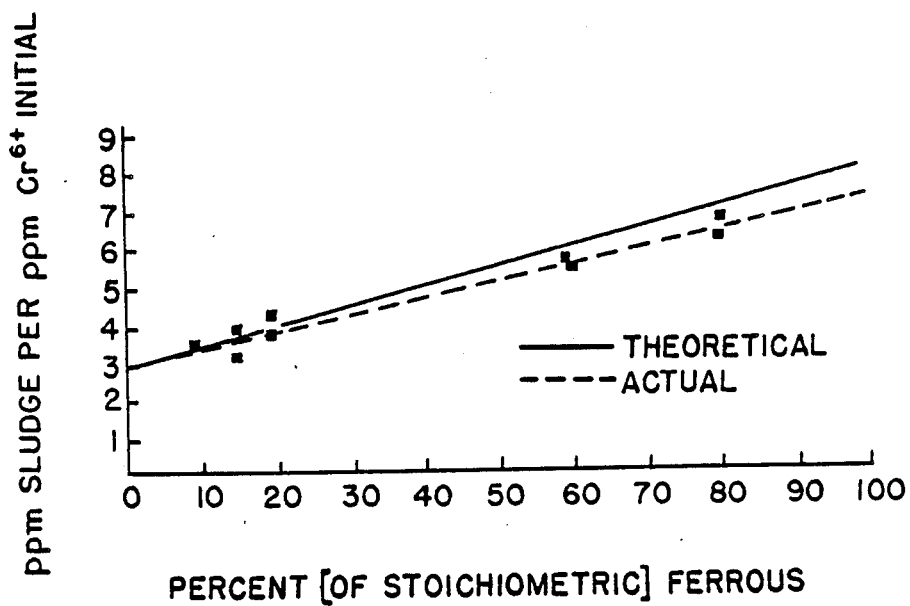
FIG. 2 is a graph showing sludge production at an alkaline pH of 10.

Although the data from both alkaline runs closely match the theoretical prediction it has been well documented that the sulfate ions, from the ferrous sulfate, may be carried with the hydration water into a metal salt, adding to sludge column. Also, even though the theoretical curve shown in FIGS. 1 and 2 is for a non-hydrated sludge, it is unreasonable to assume all hydration water was removed during sludge drying. The sulfates, although very soluble in $H_2O$, could be bound within the gel in species such as $Fe(OH_2)_5(SO_4)^+$ or $Fe(OH_2)_5(SO_4.H_2O)^+$. To establish whether or not this sulfate-complexing had occurred, ferrous chloride was substituted for ferrous sulfate and the alkaline (pH 8) reductions repeated. The anions from either ferrous compound, sulfates or chlorides, should stay in solution while the ferrous ions are oxidized and precipitated.

Figure 3:
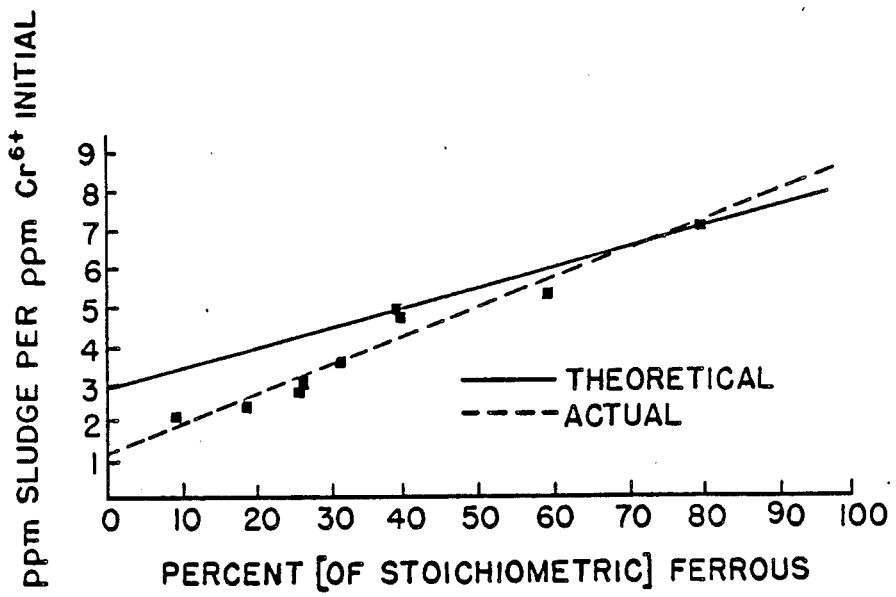
FIG. 3 is a graph showing sludge production using ferrous chloride at an alkaline pH of 8.

Hence, difference in sludge production would, therefore, be the result of sulfate complexing. The results of this test are shown in FIG. 3. The contention that the sulfates complex with the ferrous ions in a gel type matrix is supported by the results. The ferrous chloride reduction generated 25 percent less sludge than the ferrous sulfate.

To understand this 25 percent sludge volume reduction from the ferrous chloride reaction, the assumptions made in deriving the theoretical sludge production curve and the reaction equations must be checked.

The theoretical sludge production curve was based on the following reactions:

$$3Fe^{2+} + Cr^{6+} \rightarrow 3Fe^{3+} + Cr^{3+} \tag{13}$$

$$3S^{2-} + 2Cr^{6+} \rightarrow 3S° + 2Cr^{3+} \tag{14}$$

combining Equations (13) and (14) yields the overall reaction:

$$3Fe^{2+} + 3S^{2-} + 3Cr^{6+} \rightarrow 3Fe^{3+} + 3S° + 3Cr^{3+} \tag{15}$$

which can be simplified to:

$$Fe^{2+} + S^{2-} + Cr^{6+} \rightarrow Fe^{3+} + S° + Cr^{3+} \tag{16}$$

As this testing was done at pH 8, $HS^-$ was the predominate sulfide state which minimized loss as $H_2S$. During the experimental runs it was observed that if the ferrous was added after the sulfide was in solution, sulfur odors were reduced even in the acidic pH ranges. This indicated that some form of complexing phenomena had occurred.

It has been suggested that the ferrous ion, under certain circumstances, appeared to be a catalyst rather than a reactant in similar reactions. The key to whether or not catalytic reactions occur is the reduction mechanics.

First, when ferrous and sulfide ions are mixed, the following side reaction immediately occurs:

$$Fe^{2+} + S^{2-} \rightarrow FeS \tag{17}$$

The $K_{sp}$ for this reaction is very low, $5 \times 10^{-18}$ moles/liter; however, it does indicate that a small portion of the ions will be in solution instead of as molecular ferrous sulfide. On the other hand, due to the large concentration of sulfide in the reactions in the 10-20 percent ferrous dosage range (hereinafter referred to as the "10-percent Reaction") this is not the case. The imposed ionic imbalance forces the equilibrium in Equation (17) far to the right and limits the free ferrous ion concentration. This factor is what makes the 10-percent Reaction unique from other sulfide reactions. For example, in the ISP, the equilibrium of $FeS \rightarrow Fe^{2+} + S^{2-}$ is the driveing force of the reaction as the reduction capacity lies with the ferrous ion. The 10-Percent Reaction is just the opposite. The fraction of ionic ferrous to molecular ferrous sulfide is $1.3 \times 10^{-9}$. Hence, it is the FeS molecule that must derive the 10-Percent Reaction.

Looking more closely at the ferrous sulfide molecule, it has a basically positive side from the ferrous, and a predominantly negative side from the six unshared electrons on the sulfide. In an aqueous, alkaline solution, the ferrous would be surrounded by either hydroxides or waters of hydration due to this positive charge. Conversely, on the sulfide side of the molecule, there would be a strong attraction to any positive ions in solution.

The only reactive positive ion in the 10-Percent Reaction is hexavalent chromium. With the high charge density of this cation (5.5 charge units per angstrom) and the high valence, it is reasonable to presume that there will be a large attraction to both the free sulfide ions and the sulfide side of the ferrous sulfide molecule.

The reducing potential of sulfide has long been recognized with the reaction equations generally written similar to the following for the ISP:

$$Cr^{6+} + FeS \xrightarrow{[OH^-]} Cr(OH)_3 + Fe(OH)_3 + S° \tag{18}$$

and similarly for the soluble sulfide process (SSP):

$$2Cr^{6+} + 3NaHS \xrightarrow{[OH^-]} 2Cr(OH)_3 + 3S° + 3NaOH \tag{19}$$

In other research efforts, elemental sulfur was identified (via melting point testing) as a residue in the sludge after acid digestion. However, when the sludge from the 10-Percent Reaction of this invention was similarly digested, no sulfur was present. The explanation for this is based on the relatively low levels of free ferrous ions in the 10-Percent Reaction vs in the conventional ISP. An investigation of the reaction activity as pE for the $SO_4^{2-}$—$S°$—$HS^-$ system clarifies this difference.

First, consider only the free sulfide ions in solution. By disregarding the ferrous sulfide, the possible reaction is basically a straight sulfide reduction of chromium similar to Equation (19). While some reduction would occur, without some catalyst the rate is very slow. Since chromium sulfide cannot be formed in aqueous solution due to hydrolysis, the free sulfide ions become relatively inactive.

To understand the role that the ferrous sulfide plays, first an investigation of the possible byproducts of the 10-Percent Reaction must be done. It should be safe to assume that elemental sulfur is present, based on published literature. This yields two governing equations for the $SO_4^{2-}$—$S°HS^-$ system.

$$SO_4^{2-} - 8H^+ + 6e^- \rightarrow S(s) + 4H_2O \quad \log K = 36.2 \tag{20}$$

$$HS^- \rightarrow S(s) + H^+ + 2e^- \quad \log K = 2.2 \tag{21}$$

By assuming that elemental sulfur is present, the activity of solid sulfur can be taken as unity (i.e., log [S°]=0). With this information, it is possible to derive new equations from (20) and (21), describing the dependence of sulfide to sulfur and sulfate to sulfur as functions of pE.

$$\log \frac{[SO_4^{2-}]}{[S°]} = -36.2 + 8\,pH + 6\,pE \tag{22}$$

$$\log \frac{[HS_4^-]}{[S°]} = -2.2 - pH + 2\,pE \tag{23}$$

Equations (22) and (23) indicate that elemental sulfur can exist thermodynamically only in a narrow pE range. Outside this very narrow pE range, the activity of either of the other species ($SO_4^{2-}$ or $HS^-$) is greater than that for sulfur. Whether this solid sulfur condition exists in the 10-Percent Reaction can now be checked.

The 10-Percent Reaction treated 50 ppm hexavalent chromium (i.e., 2.60 meq/l), and required 2.34 meq/l of sulfide. Taking sulfide as 2 meq/millimole as previously assumed, allows the sulfide dosage to be computed in moles per liter.

$$2.34 \frac{meq}{l} \times 1 \frac{mmole}{2\ meq} = 1.17 \times 10^{-3} \frac{moles}{l}.$$

In addition, working through the redox potential for the overall reaction further substantiates why no sulfur was found in the sludge from the 10-Percent Reaction. Since the equations (22) and (23) include sulfate, sulfate will be taken as the end product in the reaction. Also, under the assumption that the ferrous ion is only a catalyst, no reduction potential will be computed for iron (potential voltages expressed as reduction potentials).

$$S^{2-} + H_2O \rightarrow SO_4^{2-} + 8H^+ + 8e^- \quad -0.14\ V \tag{24}$$

and for the chromium half reaction:

$$Cr^{6+} + 3e^- \rightarrow Cr^{3+} \quad +1.10\ \text{to}\ -0.12\ V \tag{25}$$

(This half reaction is expressed as a range as it is favorable at pH 0.5 and unfavorable at pH 13.5—the two end points of the range). Combining Equations (24) and (25), balancing for the number of electrons, and combining the protons with the hydroxides that would be in an alkaline solution yields $$8Cr^{6+} + 3S^{2-} + 48OH^- \rightarrow 8Cr(OH)_3(s) + 3SO_4 + 12H_2O. \tag{26}$$

Since the potential of the sulfide half reaction is $-0.14$ V, a potential from the chromium half reaction greater than $+0.14$ volts will favor the overall reaction.

In addition to the redox potentials, the reaction is concentration dependent as predicted by the Nernst Equation.

$$E = E_o - \frac{.0592}{\#e's\ trans} \log\left(\frac{[product]}{[reactants]}\right). \tag{27}$$

Water and precipitates can be eliminated from Equation (26) before computing the overall E. Further, since sulfates are present in chromium wastes, an initial sulfate concentration of $10^{-6}$ moles/l was used.

$$E = E_0 - \tag{28}$$

$$\frac{.0592}{24} \log \frac{[10^{-6}]^3}{[9.6 \times 10^{-4}]^8 [1.3 \times 10^{-3}]^3 [10^{-6}]^{48}},$$

$$E = E_0 - .77\ V.$$

Combining this reaction with the results of the redox potentials Equations (24) and (25) yields $$E = E_{Cr^{6+}} - 0.91\ V \tag{29}$$

Given the range of the $E_{Cr^{6+}}$ half reactions, the overall E for the system is from $+0.19$ to $-1.03$ V. However, unless the E is greater than zero, the reaction will not occur. Hence, the range of E becomes $+0.19$ V to 0.00 V. The relationship of pE to E is:

$$pE = -\log[e-] = \frac{E}{2.3\ RTF^{-1}}, \tag{30}$$

which allows the range of possible pEs to be computed (at 25° C.):

$$pE = \frac{E}{.059} \text{ such that } 0 < pE < 3.22. \tag{31}$$

Again checking this pE range shows the 10-Percent Reaction to be well out of the solid sulfur region. Hence, the assumption that solid sulfur was present was incorrect.

Given these new considerations, a new reaction equation for the 10-Percent Reaction can now be derived. Assuming that the ferrous and sulfide to ferrous sulfide reaction is immediate and complete yields:

$$FeS + 2Cr^{6+} + 8OH^- \rightarrow Fe^{2+} + 2Cr^{3+} + SO_4^{2-} + 4H_2O + 2e^- \tag{32}$$

The ferrous ion would immediately form more ferrous sulfide and the reaction would continue. The key is the electron exchanges that occur between the ferrous sulfide and the chromium. The mechanism is as follows:

$$FeS + Cr^{6+} \rightarrow FeS^{3+} + Cr^{3+}, \tag{33}$$

$$FeS^3 + Cr^{6+} \rightarrow FeS^{6+} + Cr^{3+}, \tag{34}$$

$$FeS^{6+} \rightarrow Fe^{2+} + S^{4+} \tag{35}$$

Once the $S^{4+}$ is formed in equation (35), the mechanism bringing it to sulfate in an alkaline solution is straightforward; but, equations (33) and (34) deserve more attention.

Two criteria in equations (33)–(35) must be satisfied: charge/specie balance and atomic valance. The charge and specie balance is satisfied; however, the $FeS^{3+}$ and $FeS^{6+}$ require more explanation. Sulfur is stable in the following valence states: $-2, 0, 2+,$ and $4+$. Likewise, iron is most stable in $2+, 3+, 4+,$ and $6+$ valence states. The single atoms that exist as cations are obviously stable and need not be considered further. The iron/sulfur molecules can also be shown as being stable as follows (brackets indicate a molecule):

$$FeS^{3+} = [(Fe^{3+} + e^-) + S^{1+}]^{3+}, \tag{36}$$

$$\rightarrow [Fe^{3+} + S^\circ]^{3+} \tag{37}$$

This electron transfer in Equation (37) is not a true reduction of ferrous to ferric iron. Rather, it is an electron sharing or borrowing that occurs temporarily and satisfies the valence requirements of both atoms. Similarly the other iron/sulfur species can be analyzed:

$$FeS^{6+} = [Fe^{2+} + S^{4+}]^{6+}, \tag{38}$$

$$\rightarrow Fe^{2+} + S^{3+} \tag{39}$$

Due to the transfer of three of the unshared electrons from the sulfur to the chromium (Equation (33)), the sulfur is compelled to move to a stable valence state which formed the specie shown in Equation (37). Similarly, the second transfer of three electrons (Equation 34) again forces the sulfur to the nearest stable valence state. When this occurs (Equation 38), the pseudoreduction of the iron is reversed.

This mechanism also leads to a new theoretical sludge production curve. The upper bound of the sludge that can be produced can be represented as was shown in FIG. 6. The lower bound is set by this new mechanism of sulfide going to sulfate and the iron precipitating as ferrous vs. ferric hydroxide.

Under the new mechanism, the sludge from a "0-Percent" ferrous reduction would be contributed solely by the chromium hydroxide:

$$\frac{\text{MW of chromium hydroxide}}{\text{MW chromium}} = \frac{103 \text{ g}}{52 \text{ g}} = 1.98 \text{ ppm/ppm}. \quad (41)$$

Similarly, sludge production (in ppm/ppm) for 10 percent and 20 percent iron doses is 2.24, 2.49, respectively.

This new mechanism yields an intuitive explanation as to why there was such a large difference in the sludge produced by the ferrous sulfate vs ferrous chloride. The sulfate ions from ferrous sulfate both reduce the redox potential predicted by the Nernst equation (by increasing the value of the numerator) and tend to force the equilibrium in the new overall reaction (Equation 32) away from completion.

The 300 percent increase in the reduction capability of sulfide with the 10-Percent Reaction procedure of the invention has an even greater impact on the sludge volume. A 75 percent reduction in sludge (from 8.1 mg/mg to 2.0 mg/mg) was measured in the 10-Percent Reaction compared to "standard" acidic treatment using only ferrous sulfate. In addition to the related reduced sludge disposal costs, further savings can be realized in this new method by the elimination of chemicals to reduce the influent pH to acidic levels for reduction, then raise the pH to alkaline levels for precipitation. At all pH levels investigated good results in both reaction rate and floc formation were observed. It is very possible that pH adjustment could be limited to only standby alkaline addition.

The only critical factor in the 10-Percent Reaction is the reduction of chromium to the trivalent state. Hence, control of a treatment system can be easily accomplished colorimetrically with a feedback system using the standard diphenolcarbazide (DPC) reaction. It has been shown that the color formation can be drive quickly by using sulfuric acid and an overdose of DPC. Because it is an alkaline reaction, once the chromium is reduced, all the heavy metals common to the plating waste streams will precipitate. Cadmium, which has a relatively high solubility at pH 8.0, would be precipitated as a sulfide.

Figure 4:
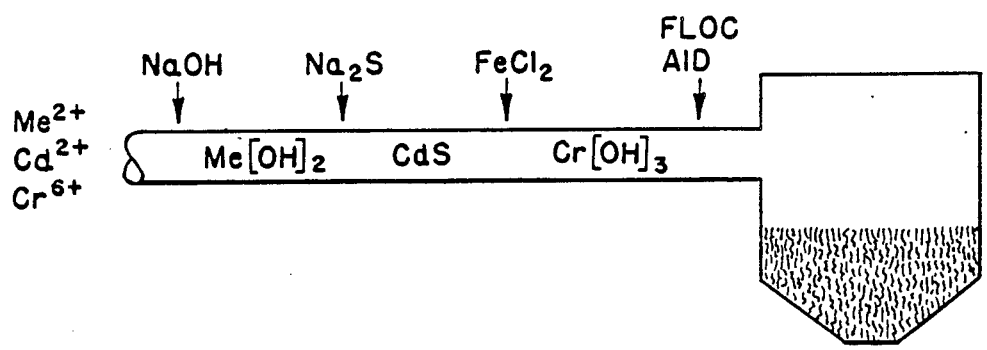
FIG. 4 is a schematic illustration showing the one-step reduction/precipitation system of this invention.

Along with these advantages, that is a lower sludge production and a lessened requirement for acid and caustic, an additional advantage of the invention it provides a one-step reduction/precipitation system which is shown schematically shown in FIG. 4.

The simplicity of the one step treatment and the efficiency of the catalytic effect make the 10-Percent Reaction a superior alternative to standard treatment technologies.

What is claimed is:

1. A method for minimizing sludge when removing hexavalent chromium from wastewater, said method comprising the steps of:
   a. determining the concentration of hexavalent chromium in said wastewater, and adjusting the pH of said wastewater to about 8 to 10 with sodium hydroxide;
   b. adding about 90 percent, stoichiometrically based on said concentration, of a first reducing chemical as a soluble sulfide,
   c. adding about 10 to 20 percent, stoichiometrically based on said concentration, of a second reducing chemical as a soluble ferrous ion;
   d. reducing said hexavalent chromium to chromium (III);
   e. precipitating said ferrous ion as a sulfide after said reducing of chromium;
   f. oxidizing said soluble sulfide to sulfate and having said sulfate remain substantially in said wastewater;
   g. adding clarifying and flocculating agents to said wastewater to produce a sludge containing said chromium (III); and
   h. removing said sludge from said wastewater wherein the volume of said sludge is about 2 parts to one part chromium.

2. A method as defined in claim 1 wherein said ferrous ion is selected from the group consisting of ferrous sulfate and ferrous chloride.

* * * * *